Aug. 29, 1967     E. H. FISHER     3,338,184
CONVERTIBLE RAIL-HIGHWAY VEHICLE
Filed Dec. 28, 1964     4 Sheets-Sheet 1
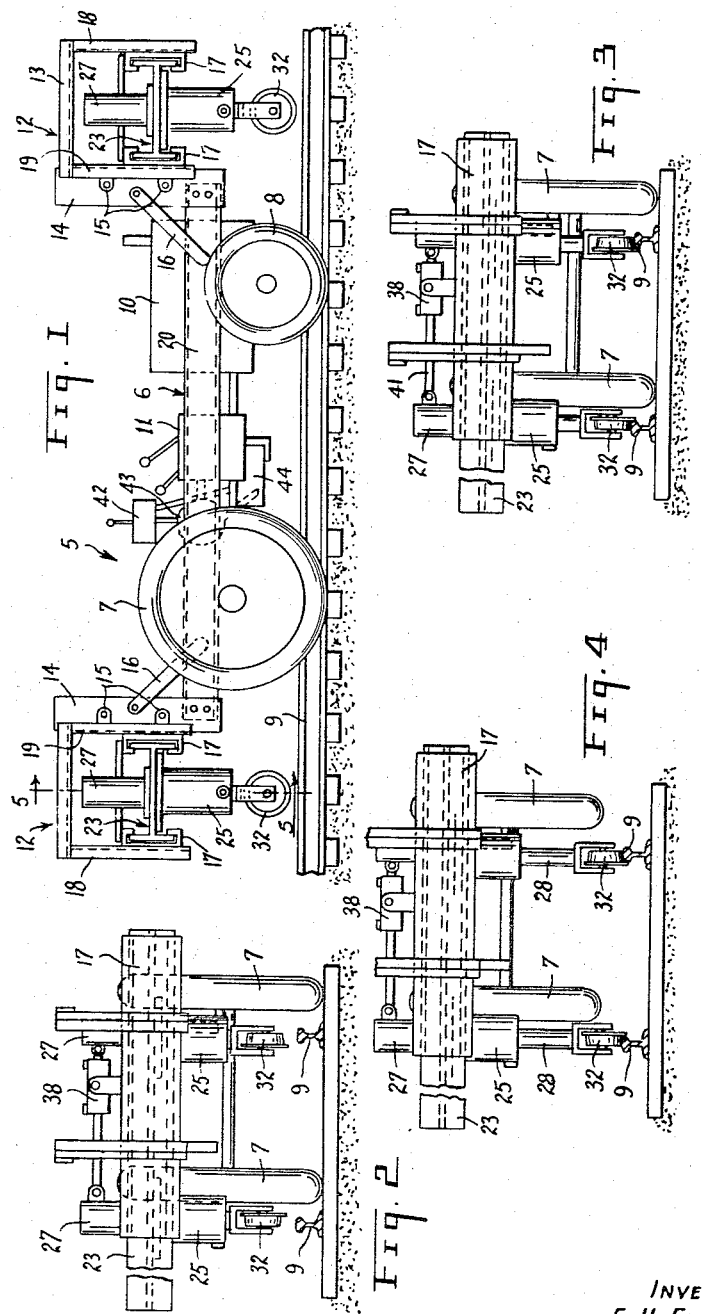
INVENTOR
E. H. FISHER
BY
Fetherstonhaugh & Co.
ATTORNEYS

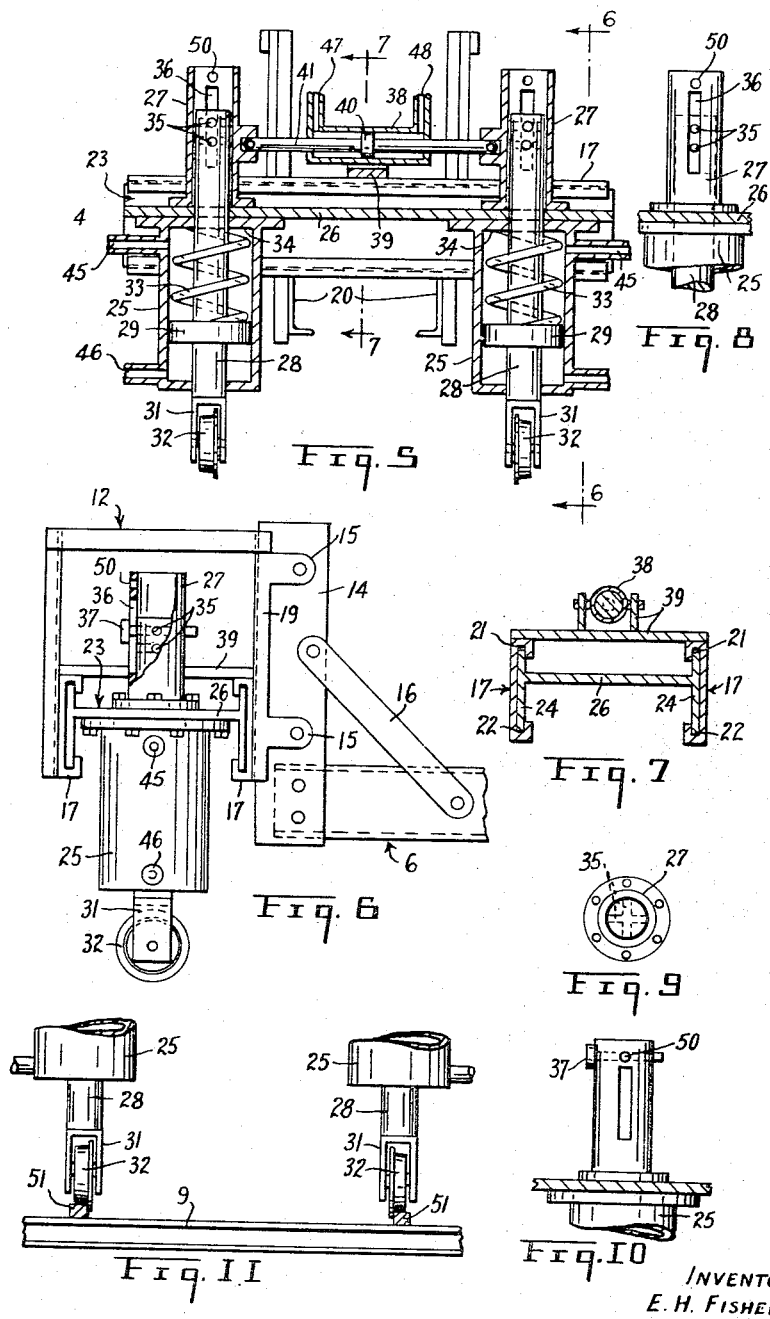

Aug. 29, 1967  E. H. FISHER  3,338,184
CONVERTIBLE RAIL-HIGHWAY VEHICLE
Filed Dec. 28, 1964  4 Sheets-Sheet 4
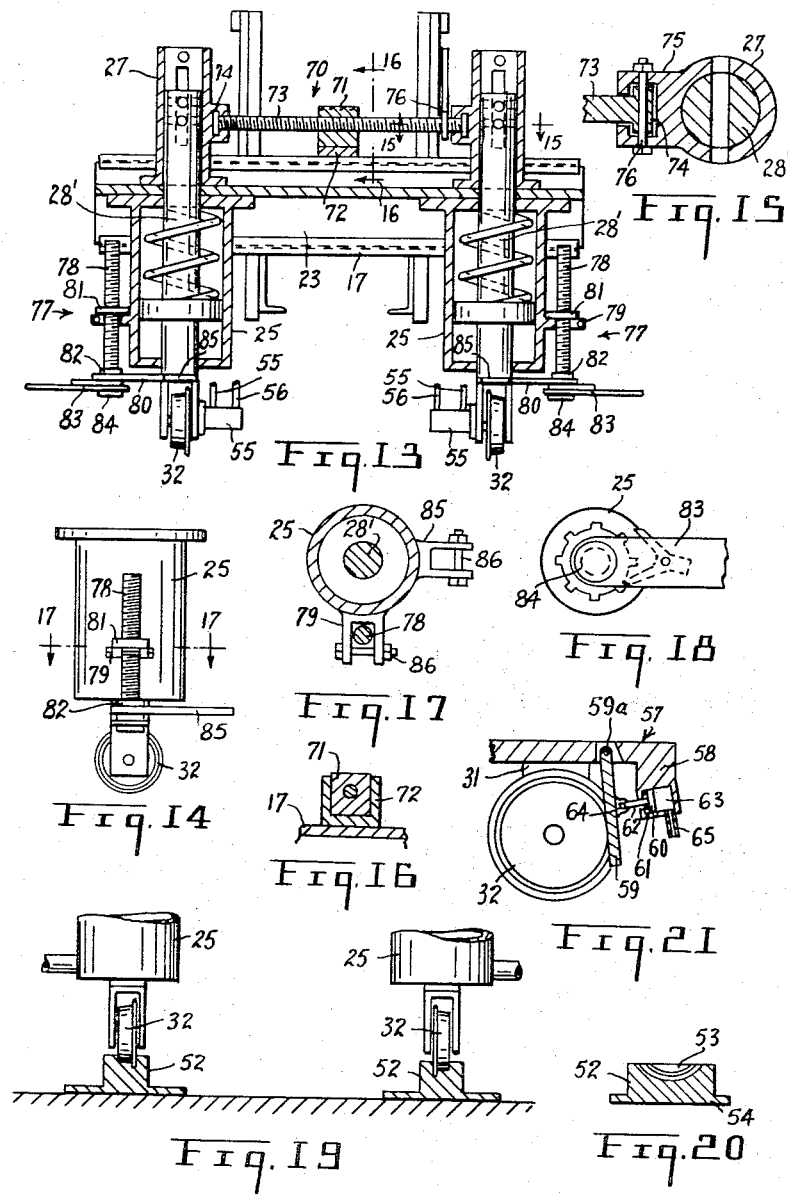
INVENTOR
BY E. H. FISHER
Fetherstonhaugh & Co.
ATTORNEYS

United States Patent Office 3,338,184
Patented Aug. 29, 1967

3,338,184
CONVERTIBLE RAIL-HIGHWAY VEHICLE
Earl H. Fisher, 630 Casgrain Ave., St. Lambert,
Quebec, Canada
Filed Dec. 28, 1964, Ser. No. 421,326
Claims priority, application Canada, Oct. 20, 1964,
914,464
10 Claims. (Cl. 105—215)

ABSTRACT OF THE DISCLOSURE

A road-rail vehicle having built-in jacking means for elevating the vehicle and rail-engaging wheels relative to each other and jacking means to move the vehicle or the rail-engaging wheels horizontally relative to each other.

This invention relates to road-rail vehicles and particularly to vehicles fitted with pneumatic wheels for operation on a roadway or on railroad tracks, and normally fitted at front and rear with retractable flanged wheel assembly whereby the flanged wheels can be aligned with the railroad tracks and the vehicle can be elevated and moved transversely relative to the flanged wheels to bring the pneumatic wheels into alignment with the railroad tracks, and vice versa.

In the past where a pneumatic tired vehicle was required to run on railroad tracks, the vehicle was brought to a railroad crossing and its pneumatic tires lined up with the top of the rails. The retractable flanged wheels, both front and rear, were lowered into position on the rails, the pneumatic tired vehicle could then run on the rails with the retractable wheels taking part of the load and keeping the pneumatic tires in line on top of the rails so that the vehicle can proceed along the track without derailing. In such cases the pneumatic tires of the vehicle and the flanged wheels were permanently aligned, longitudinally of the vehicle, with each other.

The present invention consists essentially in the provision of a flanged wheel assembly, mounted at front and rear of a pneumatically tired vehicle which will permit the vehicle to be run alongside the railroad tracks, after which the flanged wheels can be elevated above the top level of the railroad tracks, moved transversely to bring them into alignment with the tracks and then lowered into contact with the tracks after which the vehicle is elevated and moved transversely to bring its pneumatic tires into alignment with the railroad tracks and then lowered into contact with the top of the tracks. The vehicle can now run with its pneumatic tires on the top of the tracks with the flanged wheels taking a part of the load and preventing the vehicle from being derailed. The retractable flanged wheels can carry all of the load of the vehicle if required. For example, if the gauge of the pneumatic tired vehicle is not the same as the railroad track gauge or where it is not desirable to have the pneumatic tires of the vehicle to come in contact with the rail, where the operation is rail only, the pneumatic tired vehicle may be eliminated and the retractable flanged wheels used for travel and set-off purposes.

The vehicle or vehicles (one unit being towed by another or being used in tandem) are in cramped quarters (a narrow railway crossing or where it is not desirable or convenient to line the pneumatic tires of the vehicle or vehicles close to the rail) for access to the track, the vehicle or vehicles can be lined up over the rails by means of successive jacking and transverse movements in conjunction with forward movements of the vehicle or vehicles as required. With this arrangement the retractable flanged wheels would be provided with suitable blocks for transmittal of the load of the vehicle to the ground until the retractable flanged wheels can reach the rails for final alignment of the vehicle over the rails. The retractable flanged wheels are powered to provide locomotion for the vehicle or vehicles for rail travel or set-off purposes. The means whereby this operation can be carried out consists of a framework mounted at the forward and rearward ends of the vehicle, and a transversely slidable member in each framework, each carrying a pair of cylinder and piston devices by means of which the flanged wheels are elevated and lowered. The transversely slidable members are each operated by a cylinder and piston device. The reaction of continued downward pressure on the flanged wheels after they contact the rails causes the vehicle to be elevated and, with the flanged wheels contacting the rails preventing further displacement transversely of the slidable members, further operation of the cylinder and piston devices will cause the vehicle itself to be moved transversely relative to the railroad tracks to bring the pneumatic wheels into alignment above the tracks. The downward pressure on the flanged wheels is then relieved, permitting the vehicle to be lowered and bring the pneumatic wheels into contact with the top surface of the rails. In some cases the retractable flanged wheels may take all of the load. In addition, these wheels may be powered and equipped with brakes as required. The reverse operation will remove the vehicle from the rails, permitting it to resume operation on a roadway. Provision is also made whereby the individual flanged wheels can be rotated through 90° to permit the vehicle to be run on run-off rails where the ground adjacent the tracks is not suitable to run the vehicle along side the tracks to clear trains, etc. The set-off can be accomplished by powered retractable flanged wheels, if desired.

Control of the movement of the flange wheel assemblies during a transfer operation as well as locomotion and braking of the vehicle can be effected from a central position on the vehicle by means of a pump and control valve. The control valve can be detached and moved outside the vehicle so that jacking and transverse movements as well as locomotion and braking can be accomplished by one man, if desired.

Although the jacking, transverse propulsion and braking operations are by hydraulic means, nevertheless, it can be readily seen that these movements could be accomplished by pneumatic, mechanical, manual, manual mechanical means etc. Also a hand hydraulic pump may be substituted to activate any or all of these hydraulic functions.

The object of the invention is to provide means whereby a pneumatically tired vehicle, such as a tractor, truck or trailer, can be rapidly transferred from road to rail operation.

A further object of the invention is to provide means whereby retractable flanged wheel assemblies on a pneumatically tired vehicle can be moved transversely of the vehicle and be used to elevate the vehicle and move the vehicle sideways into alignment with railroad tracks.

A further object of the invention is to provide means whereby the transverse movement of the flanged wheel assemblies and the vehicle can be effected through pneumatic or hydraulic means.

A further object of the invention is to provide means whereby the flanged wheels can be run on run-off rails transversely of the railroad tracks.

These and other objects of the invention will be apparent from the following detailed specification and the accompanying drawings, in which:

FIG. 1 is a side elevation of a pneumatic tired vehicle having front and rear flanged wheel assemblies according to the present invention, and showing the vehicle located alongside a railroad track, with the flanged wheels elevated above the tracks.

FIG. 2 is a rear end view of the vehicle shown in FIG. 1.

FIG. 3 is a view similar to FIG. 2 but showing the flanged wheels lowered into contact with the railroad tracks.

FIG. 4 is a view similar to FIG. 3 but showing the vehicle elevated above the level of the tracks to permit the vehicle to be moved sideways to align the pneumatic tires with the railroad tracks.

FIG. 5 is an enlarged cross section taken on the line 5—5 of FIG. 1 showing the flanged wheel assembly in mid position of the vehicle.

FIG. 6 is a side elevation of the structure shown in FIG. 5 looking in the direction of the arrows 6—6.

FIG. 7 is a cross section on the line 7—7 of FIG. 5.

FIG. 8 is a detail of one of the upper guide cylinders showing the alignment of the slot in the cylinder and pin engaging apertures in the flanged wheel supporting shaft.

FIG. 9 is a top plan view of the guide cylinder and the top of flange wheel supporting shaft.

FIG. 10 is a view similar to FIG. 8 showing a pin securing the flange wheel supporting shaft in the extreme raised position.

FIG. 11 is a partial elevation showing the flanged wheel supporting shafts rotated through 90° and engaging with a set of run-off rails.

FIG. 13 is a view similar to FIG. 5 but showing mechanical screw means for providing transverse movements to the assembly and for raising and lowering the flanged wheels, and in addition showing unitary power drive means for the flanged wheels.

FIG. 14 is a side elevation of one of the wheel raising and lowering screw devices showing a second screw receiving bracket on the wheel carrying shaft.

FIG. 15 is a horizontal section taken on the line 15—15 of FIG. 13.

FIG. 16 is a vertical section on the line 16—16 of FIG. 13.

FIG. 17 is a horizontal section taken on the line 17—17 of FIG. 14.

FIG. 18 is a bottom plan view of FIG. 14.

FIG. 19 is a partial elevation showing the flanged wheels, of the arrangements shown in FIG. 5 or 13, mounted on blocks.

FIG. 20 is a vertical section of one of the blocks shown in FIG. 18.

FIG. 21 is a side elevation of a flanged wheel assembly, showing in section a brake unit.

Figure 12:
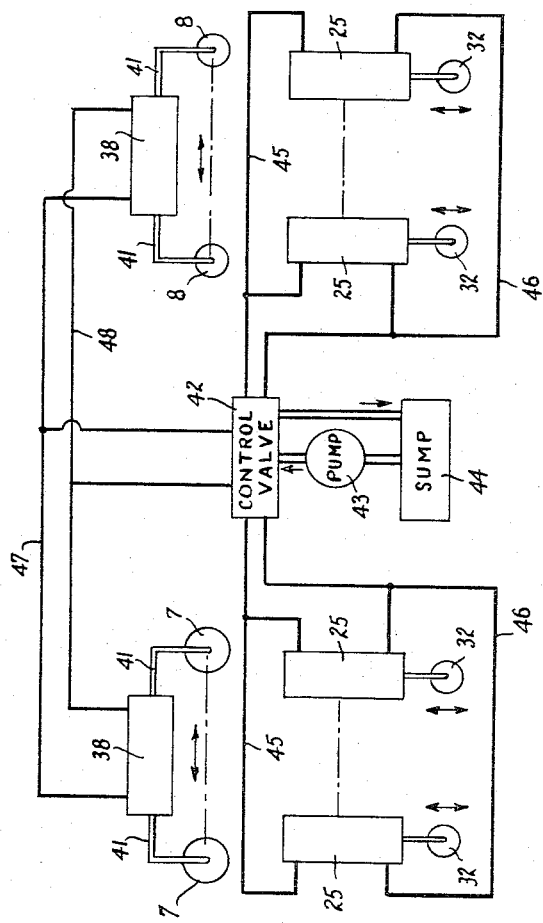
FIG. 12 is a diagram showing the hydraulic controls for the vehicle.

Referring to the drawings, the vehicle 5 is here shown as being of the tractor type but could be either a truck or a trailer or any other type of wheeled vehicle which is adaptable for operation on a roadway or on railroad tracks.

The vehicle 5 is provided with a frame 6 supported by pneumatic tired wheels 7 and 8 spaced transversely of the vehicle to coincide with the vertical centre-line of the railroad track 9 on which the vehicle is expected to run. If the vehicle pneumatic tires are not to railroad gauge or if it is desirable that the pneumatic tires not come in contact with the rails then the retractable flanged wheels can take all of the load of the vehicle. The vehicle 5 is provided with an engine 10 and gear box 11 from which the drive to the wheels 7 is taken in well known manner.

A pair of flanged wheel assemblies 12 are mounted on the vehicle frame 6, one at the front and one at the rear of the vehicle. Each assembly consists of a pair of inverted U-shaped frames 13 transversely spaced apart and secured to the upright members 14 of the vehicle frame 6 by the lugs 15 which, in turn, are supported by the brace members 16.

A pair of horizontally disposed guide members 17 form part of each assembly 12 and are mounted on the inwardly facing surface of the vertical legs 18 and 19 of the U-shaped frames 13. Each of the guides 17 project outwardly a considerable distance beyond the longitudinal side members 20 and each has a pair of opposing top and bottom guide slots 21 and 22.

Slidably mounted in the guide slots 21 and 22 of opposing guide members 17 is an H frame member 23 whose vertical legs 24 are slidably engaged in the guide slots 21 and 22. A pair of cylinders 25 are mounted on the underside of the horizontal leg 26 of the H member 23, and a pair of guide cylinders 27 are mounted on the upper surface of the horizontal leg 26. The cylinders 25 and guide cylinders 27 are located in pairs co-axial with each other. Axially mounted in each pair of cylinders 25 and 27 is a shaft 28 having a piston 29 thereon disposed within the cylinder 25. The lower end of the shaft 28 extends through the lower end wall 30 of the cylinder 25 and has its end forked at 31 to receive the flanged wheel 32. The transverse spacing of the pairs of cylinders 25 and 27 is such that the flanged wheels 32 will engage with the rails 9 in the manner shown in FIGS. 3 and 4.

A spring 33 surrounds the shaft 28 in each of the cylinders 25 between the piston 29 and the upper end wall 34 of the cylinder.

The upper end of each shaft 28 is provided with one or more pairs of transverse bores 35, each pair of bores being located at 90° from each other. One set of bores 35 are aligned in the plane of rotation of the flanged wheel 32 and the other set of bores are aligned in a plane parallel with the axis of the wheel 32 as will be seen in FIG. 6. The guide cylinders 27 are each provided with a pair of vertically disposed slots 36 located in the plane of rotation of the flanged wheels 32 and are aligned with the bores 35 in the same plane. A headed pin 37 passes through the slots 36 and aligned bores 35 to hold the shaft 28 and flanged wheel 32 against rotation and, at the same time, permits vertical displacement of the shaft 28 against the action of the spring 33 during normal travel of the vehicle on the rails 9.

A piston and cylinder device 38 is mounted on the bracket 39, the bracket bridging the space between the top surfaces of the opposing guide members 17. The device 38 is disposed to operate parallel with the guides 17 and its piston 40 is connected to the pair of adjacent guide cylinders 27 by the rods 41.

The cylinder and piston devices 25 and 38 are serviced from a control valve 42 connected with a pump 43 and oil sump 44.

The control valve 42 is connected with the upper end of each of the cylinders 25 through the connections 45 and with the lower end of these cylinders through the connections 46, so that all the flanged wheels 32 can be raised or lowered simultaneously. The control valve 42 is connected with the left hand end of each cylinder 38 through the connections 47 and with the right hand ends of these cylinders through the connections 48. The action of the control valve 42 is such that the cylinders 38 cannot be operated unless the flanged wheels are raised clear of the rails 9 as shown in FIGS. 1 and 2.

When the vehicle 5 is operating on a roadway the flanged wheels 32 are raised to their limit and the pins 37 are passed through the apertures 50 in the guide cylinders 27 and through one of the bores 35 in the shafts 28. This is a safety measure to prevent inadvertent lowering of the flanged wheels 32 while the vehicle is operating on a roadway.

Where it is not convenient to align the vehicle alongside the rails, in the manner shown in FIG. 2, but successive jacking operations have to be performed to bring the vehicle to a position alongside the rails, suitable blocks 52 are provided. These blocks 52 are provided with a radial recess 53 matching the diameter and transverse shape of the flanged wheels 32 and are provided with a broad base 54 whereby the load of the vehicle is transmitted to the ground at each stage of the jacking operation.

In FIG. 13, the flanged wheels 32 are shown equipped with a unitary drive means for propulsion of the vehicle on the railroad tracks 9, independently of a towing vehicle. In this instance the unitary drive is shown as a hydraulic motor 55. Hydraulic liquid for pressure and return is provided by the control valve 42, FIG. 12, through the pressure lines 55 and 56.

In FIG. 21 there is shown brake means for the flanged wheels 32. This brake means 57 consists of a bracket 58 which is attached to the fork member 31. A brake shoe 59 is pivoted at 59a on the bracket 58. A piston 60 and return spring 61 together with piston rod 62 are enclosed in the single acting hydraulic cylinder 63. The piston rod 62 is connected to the brake shoe 58 by connecting means 64.

When hydraulic pressure is applied through the hydraulic hose 65, the piston 60 is forced downwards, thus forcing the brake shoe 58 against the face of the wheel 32.

When the hydraulic pressure is released, the return spring 61 moves piston 60 upwards and the brake shoe 58 is moved away from the face of the wheel 32.

In FIGS. 13 to 17 there is disclosed a mechanical screw arrangement for moving the flanged wheel assembly transversely and vertically.

In this arrangement the hydraulic cylinder and piston assembly 38 of FIG. 5 is replaced by a screw device 70 comprising a fixed nut 71 mounted on the block 72 and a threaded bar 73 threaded through the nut 71. The ends 74 of the threaded bar 73 are held captive in the recessed blocks 75 on the opposing sides of the guide cylinders 27 by the bolts 76, as shown in detail in FIG. 15. The threaded bar 73 is rotated in one direction or another by the ratchet 76 to effect horizontal movement of the H frame member 23 relative to the guide members 17.

Vertical movement of the shafts 28' and the flanged wheels 32 is accomplished by means of the screw devices 77. Each screw device 77 consists of a screw 78 fitted into the slotted brackets 79 and 80, the brackets 79 projecting horizontally from the side of the cylinders 25 and the brackets 80 projecting at right angles horizontally from the side of the forked ends 31 of the shafts 28'. The brackets being aligned vertically with each other parallel with the axis of rotation of the flanged wheels 32. A nut 81 is threaded on the screw 78 above the bracket 79. A retainer flange 82 on the screw 78 is located above the upper surface of the bracket 80 and a ratchet 83 is located between the under surface of the bracket 80 and the enlarged head 84 on the bottom end of the screw. The ratchet 83 effects rotation of the screw 78 in either direction, the nut 81 being held against rotation against the surface of the cylinder 25. Rotation of the screw 78 in one direction raises the shaft 28' relative to the cylinder 25 against the pressure of the spring 33, while rotation in the opposite direction lowers the shaft 28' assisted by the pressure of the spring 33.

When the flanged wheels 32 are rotated through 90° for moving the vehicle on set-off rails, the screw devices are first disengaged from the brackets 80 and engaged with the brackets 85 projecting from the forked ends 31 of the shafts 28' at right angles to the brackets 80.

The screw devices 77 are retained in their brackets 79 and 80 or 79 and 85 by the bolts 86.

Where conditions do not permit the vehicle 5 to be run along side the rails 9 in the manner shown in FIGS. 1 and 2 or to be moved off the rails in the reverse operation but, instead, the vhicle has to be moved over, say a ditch at the sides of the rail line, use is made of the run-off rails 51. In this case, the vehicle is located parallel to the rails 9, as close as possible, and the run-off rails are laid in place. The shafts 28 are then rotated through 90° to bring the flanged wheels 32 into the plane of the run-off rails 51. The pins 37 can then be removed from the apertures 50 and transferred to pass through the slots 36 and bores 35 to permit the flanged wheels to be lowered into contact with the run-off rails. The vehicle can then be moved along the run-off rails either to transfer it from a roadway to the rails or vice versa.

In the operation of this invention, when the vehicle 5 is operating on a roadway, the flanged wheels are raised to their limit and are held in this position by the pins 37, and in this position offer no impediment to the normal roadway operation of the vehicle.

When it is desired to transfer the vehicle from roadway operation on to the railroad tracks, the vehicle is driven alongside the rails 9 so that each pair of pneumatic wheels 7 and 8 are located alongside the rails in the manner shown in FIGS. 1 and 2. The position of the H frames 23 are then adjusted in their guides 17, transversely of the vehicle, by means of the cylinder and piston devices 38, to bring the flanged wheels into alignment with the rails 9. The pins 37 are then removed from the apertures 50 in the guide cylinders 27 and transferred to the slots 36 and passed through a selected bore 35 in the shafts 28, taking care that the flanged wheels are aligned to rotate on the rails 9. Fluid pressure is then applied from the control valve 42 through the lines 45 to the top of the pistons 29 in the cylinders 25, forcing the pistons 29 downwards to bring the flanged wheels into contact with the rails 9, assisted by the springs 33.

Continued downward pressure on the piston 29 is maintained which has the effect of raising the whole vehicle upwards so that the bottom of the pneumatic tired wheels 7 and 8 are lifted above the top level of the rails 9, as shown in FIG. 4.

The cylinder and piston devices 38 are now energized to move the vehicle and the guides 17 relative to the H frames to bring the pneumatic tired wheels 7 and 8 into position over the rails 9, the H frames being constrained from transverse movement by reason of the engagement of the flanged wheels with the rails.

Pressure fluid is now released from the top of the pistons 29, allowing the vehicle to be lowered until the pneumatic wheels 7 and 8 make contact with the top surface of the rails 9 if so desired. Under this condition, the springs 33 will maintain the flanged wheels in constant contact with the rails under all normal operating conditions and thereby take all or part of the load of the vehicle in addition to preventing derailment of the pneumatic wheels of the vehicle.

In the reverse operation where it is desired to remove the vehicle from the rails 9 and transfer it to a roadway, pressure fluid is passed from the control valve 42 through the lines 45 to the top of the pistons 29 in order to elevate the vehicle and its pneumatic tired wheels 7 and 8 clear of the rails while maintaining the flanged wheels in firm contact on the rails. After the wheels 7 and 8 are clear of the rails 9, the cylinder and piston devices 38 are energized to move the vehicle to whichever side of the railroad track it is desired to place the vehicle. When the vehicle is in the position shown in FIG. 4 pressure is released from the top of the pistons 29 allowing the vehicle to be lowered to the ground alongside of the tracks. Fluid pressure from the control valve 42 is then permitted to pass through the lines 46 to the lower side of the pistons 29, thereby raising the flanged wheels up clear of the rails 9. The shafts 28 are then secured in their raised position by the pins 37. The cylinder and piston devices 38 are then energized to bring the H frame 23 and flanged wheel assemblies transversely into a mid position relative to the vehicle. The vehicle can now be driven away from the rails on to a roadway.

The brake means 57 is controlled by the control valve 42, as is also the unit drive motors 55, when such are fitted to the vehicle.

The vertical and transverse operation of the flanged wheel assemblies as described above by hydraulic means is duplicated by mechanical means using the screws and ratchets shown in FIG. 13.

While the invention has been described mainly in connection with a vehicle having flanged wheel assemblies at front and rear, it will be apparent that in some trailer type vehicles only the rear flanged wheel assemblies may be utilized.

What I claim is:

1. A vehicle adapted for travel in a highway or railroad track and on set-off tracks located at right angles to the said railroad tracks, the said vehicle having two or more pairs of road engaging wheels having a gauge permitting the said wheels to run on the top of the railroad tracks, if desired, and one or more pairs of railroad track engaging flanged wheels, means to raise and lower the said pairs of flanged wheels relative to the said vehicle, and means to move the said pairs of flanged wheels horizontally, transversely of the vehicle when the said flanged wheels are in the raised position relative to the railroad tracks and to move the said vehicle transversely of the railroad tracks when the said flanged wheels are engaged with the tracks.

2. A vehicle as set forth in claim 1, in which the said first and second mentioned means are hydraulic cylinder and piston devices.

3. A vehicle as set forth in claim 1, in which each of the means to raise and lower each pair of flanged wheels includes a pair of cylinder and piston devices, a shaft operably connected to each cylinder and piston device, the said cylinder and piston devices each includes a spring biased to hold the said flanged wheels in contact with the railroad tracks when the pressure in the cylinder and piston devices is reduced or cut-off.

4. A vehicle as set forth in claim 1, in which the said means to raise and lower the said pairs of flanged wheels, when operable to lower the said flanged wheels into contact with the said railroad tracks, create a reactive force to raise the said vehicle and elevate the said road engaging wheels above the level of the railroad tracks, and the means to move the flanged wheels horizontally transversely of the vehicle, creates a reactive force to move the vehicle in a transverse direction to bring the said road engaging wheels into alignment above the railroad tracks when the pairs of flanged wheels are engaged with the railroad tracks.

5. A vehicle adapted for travel on a highway or on railroad tracks and on set-off tracks located at right angles to the said railroad tracks, the said vehicle having two or more pairs of road engaging wheels having a gauge permitting the said vehicle to run on the top of the railroad tracks, one or more fixed horizontally disposed guideway located transversely on the said vehicle, a frame slidably mounted on each of said guideways, a pair of railroad track engaging wheel assemblies mounted on the said frames, each of said wheel assemblies including a pair of cylinder and piston devices mounted in spaced apart relation on said frame at a distance approximately equal to the gauge of the railroad tracks the said cylinder and piston devices each including a flanged rail engaging wheel mounted for axial movement with respect to the cylinder and piston device and for axial rotation from a position parallel with the rails to a position at right angles to the rails, the said cylinder and piston devices when energized for movement in one direction effects movement of the said flanged wheels vertically to lower the flanged wheels into engagement with the railroad tracks and, on extended movement reactively to raise the said vehicle and its road engaging wheels relative to the railroad tracks and, when energized for movement in the opposite direction raises the said rail engaging wheels above the top level of the railroad tracks and, on extended movement upwards, lower the said vehicle and its road engaging wheels into contact with the road surface, and a cylinder and piston device, including a double ended piston rod, mounted on the said guideway, the said latter cylinder and piston device when energized adapted to move the said frame and track engaging wheel assemblies transversely of the vehicle when the said flanged wheels are in the raised position relative to the railroad tracks and to move the said vehicle transversely of the railroad tracks when the said flanged wheels are engaged with the tracks, the said flanged wheels when rotated through 90° about the axis of the first mentioned cylinder and piston devices being in position for engagement with set-off rails when the wheels are in an elevated position.

6. A vehicle as set forth in claim 5, in which each of said cylinder and piston devices includes an upwardly extending guide cylinder and the said shafts extend upwards into said guide cylinders and a pin passes through said guide cylinders and shafts to hold the flanged wheels locked in their raised position.

7. A vehicle as set forth in claim 6, in which the said guide cylinders have a vertical slot and a pin passing through the said slot and shaft permits vertical movement of the shaft and associated flanged wheel during normal running contact of the flanged wheel on the railroad track.

8. A vehicle as set forth in claim 5, in which each of said cylinder and piston devices includes a spring biased to hold the said flanged wheels in contact with the railroad tracks.

9. A vehicle as set forth in claim 5, in which each of said cylinder and piston devices includes means to hold the said flanged wheels with their axis at right angles to the said railroad tracks and alternatively parallel to the railroad tracks.

10. A vehicle as set forth in claim 5 in which a control valve controls the operation of the said first mentioned cylinder and piston devices to raise and lower the flanged wheels and to control the operation of said second mentioned cylinder and piston device to move the said flanged wheel assemblies transversely in unison when the flanged wheels are in the raised position.

References Cited

UNITED STATES PATENTS

| | | | |
|---|---|---|---|
| 1,827,898 | 10/1921 | Moore | 105—215 |
| 2,090,768 | 8/1937 | Thomas | 180—1 |
| 2,158,352 | 5/1939 | Brown | 105—177 |
| 2,896,533 | 7/1959 | Whisler | 105—215 |
| 3,020,858 | 2/1962 | Perkins et al. | 105—215 |

ARTHUR L. LA POINT, *Primary Examiner.*

H. BELTRAN, *Assistant Examiner.*